US009258951B2

(12) United States Patent
Sacks

(10) Patent No.: US 9,258,951 B2
(45) Date of Patent: *Feb. 16, 2016

(54) SYSTEM AND METHOD FOR IRRIGATION CONTROL

(75) Inventor: Rael Sacks, Fresno, CA (US)

(73) Assignee: NATIONAL DIVERSIFIED SALES INC., Fresno, CA (US)

( * ) Notice: Subject to any disclaimer, the term of this patent is extended or adjusted under 35 U.S.C. 154(b) by 1285 days.

This patent is subject to a terminal disclaimer.

(21) Appl. No.: 13/152,831

(22) Filed: Jun. 3, 2011

(65) Prior Publication Data

US 2011/0231025 A1    Sep. 22, 2011

Related U.S. Application Data

(63) Continuation of application No. 12/258,326, filed on Oct. 24, 2008, now Pat. No. 7,957,843.

(51) Int. Cl.
*A01G 25/16* (2006.01)

(52) U.S. Cl.
CPC ............ *A01G 25/16* (2013.01); *Y10T 137/1866* (2015.04)

(58) Field of Classification Search
CPC ... A01G 25/16; A01G 25/162; A01G 25/165; A01G 25/167; G05B 2219/2625
USPC ...................... 700/282–284; 137/78.2, 624.12
See application file for complete search history.

(56) References Cited

U.S. PATENT DOCUMENTS

| | | |
|---|---|---|
| 5,978,738 A | 11/1999 | Brown |
| 6,076,044 A | 6/2000 | Brown |
| 6,102,061 A | 8/2000 | Addink |
| 6,227,220 B1 | 5/2001 | Addink |
| 6,298,285 B1 | 10/2001 | Addink et al. |
| 6,452,499 B1 | 9/2002 | Runge et al. |
| 6,597,990 B2 | 7/2003 | Brown |
| 6,714,134 B2 | 3/2004 | Addink et al. |
| 6,892,113 B1 | 5/2005 | Addink et al. |
| 6,892,114 B1 | 5/2005 | Addink et al. |
| 6,895,987 B2 | 5/2005 | Addink et al. |
| 6,947,811 B2 | 9/2005 | Addink et al. |
| 6,950,728 B1 | 9/2005 | Addink et al. |
| 6,963,808 B1 | 11/2005 | Addink et al. |
| 7,010,394 B1 | 3/2006 | Runge et al. |
| 7,048,204 B1 | 5/2006 | Addink et al. |
| 7,096,094 B2 | 8/2006 | Addink et al. |
| 7,317,972 B2 | 1/2008 | Addink et al. |
| 7,330,796 B2 | 2/2008 | Addink et al. |
| 7,363,113 B2 | 4/2008 | Runge et al. |

*Primary Examiner* — Mohammad Ali
*Assistant Examiner* — Nathan L Laughlin
(74) *Attorney, Agent, or Firm* — Fulwider Patton LLP

(57) ABSTRACT

A method of controlling the duration of irrigation is described, comprising compiling a database that includes information relating to historical evapo-transpiration rates for a plurality of sectors (preferably identified by zip code) located within a geographical area. Period Reduction Factors for each sector are derived. Parameters are entered into the controller including a Maximum Irrigation Duration, a sector identifier; and the current date. The Maximum Irrigation Duration is adjusted by multiplying the Maximum Irrigation Duration by a Period Reduction Factor for the current period associated with the sector that has been identified by the user, to obtain an Actual Irrigation Duration. The irrigation system is caused to irrigate for the Actual Irrigation Duration during the current period.

16 Claims, 5 Drawing Sheets

SYSTEM AND METHOD FOR IRRIGATION CONTROL

CROSS-REFERENCES TO RELATED APPLICATIONS

This Application is a Continuation of application Ser. No. 12/258,326, filed Oct. 24, 2008, which is incorporated by reference in its entity.

BACKGROUND

The present invention relates to a system and method for regulating the operation of an irrigation system. More particularly, the invention pertains to a system and method for regulating the operation of an irrigation system which is responsive to user programmed information.

Automatic irrigation systems such as those employed for landscape and agricultural watering are well known in the art. Typical irrigation systems use a means of controlling the watering cycles via an automatic controller. The need to control watering cycles due to seasonal changing environmental conditions is important for saving costs, optimizing growing conditions, and preventing unsafe conditions.

Typically, a user will enter instructions into a microprocessor based controller that will cause the irrigation system to start irrigation at a certain time, on certain days, for a certain duration, according to the user's instructions. Irrigation may be based on "zones" in which a group of sprinkler heads discharge in unison, or sequentially, or a combination of both.

Typically, a user who programs the microprocessor in the summer month of July to deliver an irrigation event of a certain duration on certain days from a particular irrigation system, would, if reminded to attend to the issue, reduce that duration over the fall, winter, and spring months to take account of changing seasonal environmental conditions that can be expected to prevail in the vicinity of the irrigation system, and the user might reduce the duration accordingly each month, or shorter period, before increasing it again. Typically, however, many users tend to forget to downwardly adjust the irrigation duration after the hot summer months to account for the reduced evapo-transpiration rates over the following months. At best, a user will typically remember to adjust irrigation for some months or shorter period, but not others. As a result, the irrigation system continues to discharge water in irrigation during the fall, and winter at a rate that was selected to be suitable during the summer, or some other time that is inappropriate. This can be very wasteful, not to mention destructive in the case of certain crops, grasses, flowers, and shrubs that react adversely to over or under watering.

Consequently, solutions have been developed for taking into account actual environmental conditions prevailing, and for automatically adjusting irrigation duration to take account of changed conditions in real time. These solutions typically employ a sensor that monitors changes in environmental conditions in real time. A sensor may be located near an associated controller, and may be linked to the controller either by wireless communication or by physical connection. Such a sensor may measure actual precipitation, actual temperatures, actual wind speed, soil moisture, humidity, and other environmental factors, all in real time. Based on these measurements which are transmitted back to the controller, the controller uses preprogrammed logical algorithms and decides how to adjust a preprogrammed irrigation schedule to account for changed environmental conditions. For example, if high temperatures and dry conditions are recorded, irrigation duration may be increased. If wet or cold conditions are noted, irrigation may be reduced or suspended altogether.

However, such sensor based systems have drawbacks and disadvantages. They are notoriously complex, and difficult to calibrate and install. Typically, weather sensors are mounted where they are exposed to the elements and once mounted are not easily adjusted or manipulated. They add significantly to the cost of a controller system that must be preprogrammed to take into account a host of new variables and logic subroutines. They are prone to malfunction, and difficult to maintain in operation.

Accordingly, there is a need in the art for an irrigation controller that may be sold and used universally, that is easy to use, that is inexpensive to manufacture, that is easy to install, initialize, maintain, and operate, and that yet takes account of the fact that seasonal environmental conditions vary during the year in any location—and that, accordingly, enables the amount of irrigation in any location to be automatically varied for efficient use of the system. The present invention addresses these and other needs.

SUMMARY OF THE INVENTION

According to a preferred embodiment of the invention, there is described an irrigation controller suitable for use in any part of the world, that takes into account average environmental changes over the course of a year, but that is simple to use and inexpensive to make.

In one aspect, the invention is a controller for controlling an irrigation schedule in an irrigation system that includes a plurality of sprinkler heads connected via a plurality of conduits to a water source. The controller comprises a database that includes information relating to historical evapo-transpiration ("ET") rates for a plurality of sectors located within a geographical area. The information includes Period Reduction Factors for each sector. The Period Reduction Factors are a compilation (for each period) of the ratio of ET rate for the current period divided by the maximum ET rate that occurs during the year in the location of the controller. The controller further includes an input means for permitting a user to enter irrigation parameters into the controller, wherein the parameters include a Maximum Irrigation Duration ("Dmax", the maximum irrigation duration, chosen to coincide with the period of maximum ET rate), an identifier for identifying the sector in which the irrigation system is located, and the current date. A microprocessor is configured to adjust the Maximum Irrigation Duration that has been entered into the controller by multiplying the Maximum Irrigation Duration by a Period Reduction Factor for the current period, associated with the sector that has been identified by the user, to obtain an Actual Irrigation Duration ("Dactual") for the current period for the identified sector. The microprocessor is configured to cause the irrigation system to irrigate for the Actual Irrigation Duration during the current period, rather than the Dmax, which will only occur in the period of highest ET rate.

In a further aspect of the invention, the microprocessor is configured to sequentially recalculate the Actual Irrigation Duration in each new period by applying the Period Reduction Factor associated with the new period, and causing the irrigation system to irrigate for the Actual Irrigation Duration during the new current period. In a preferred aspect of the invention, the period associated with the Period Reduction Factor is a day.

In yet a further facet, the invention is a method of controlling the duration of irrigation by an irrigation system that includes a plurality of sprinkler heads connected via a plurality of conduits to a water source. The method comprises compiling a database that includes information relating to historical evapo-transpiration rates for a plurality of sectors located within a geographical area. A further step includes deriving, from the information, Period Reduction Factors applicable over a year for each sector. Irrigation parameters are entered into the controller, wherein the parameters include, a Maximum Irrigation Duration, an identifier for identifying the sector in which the irrigation system is situated, and the current date. Thereafter the Maximum Irrigation Duration is adjusted by multiplying the Maximum Irrigation Duration by a Period Reduction Factor for the current period associated with the sector that has been identified by the user, to obtain an Actual Irrigation Duration for the current period for the identified sector. Finally, the irrigation system is caused to irrigate for the Actual Irrigation Duration during the current period.

In a further aspect, entering a sector identifier into the controller includes entering a zip code, and the period associated with the Period Reduction Factor is one day.

Finally, in a yet a further aspect, adjusting the Maximum Irrigation Duration includes sequentially recalculating the Actual Irrigation Duration in each new period by applying the Period Reduction Factor associated with each new period, and causing the irrigation system to irrigate for the Actual Irrigation Duration during the new current period.

These and other advantages of the invention will become more apparent from the following detailed description thereof and the accompanying exemplary drawings.

DETAILED DESCRIPTION OF THE PREFERRED EMBODIMENTS

With reference to the drawings, which are provided for exemplification and not limitation, a preferred embodiment of an irrigation controller is described having features of the present invention.

Figure 1:
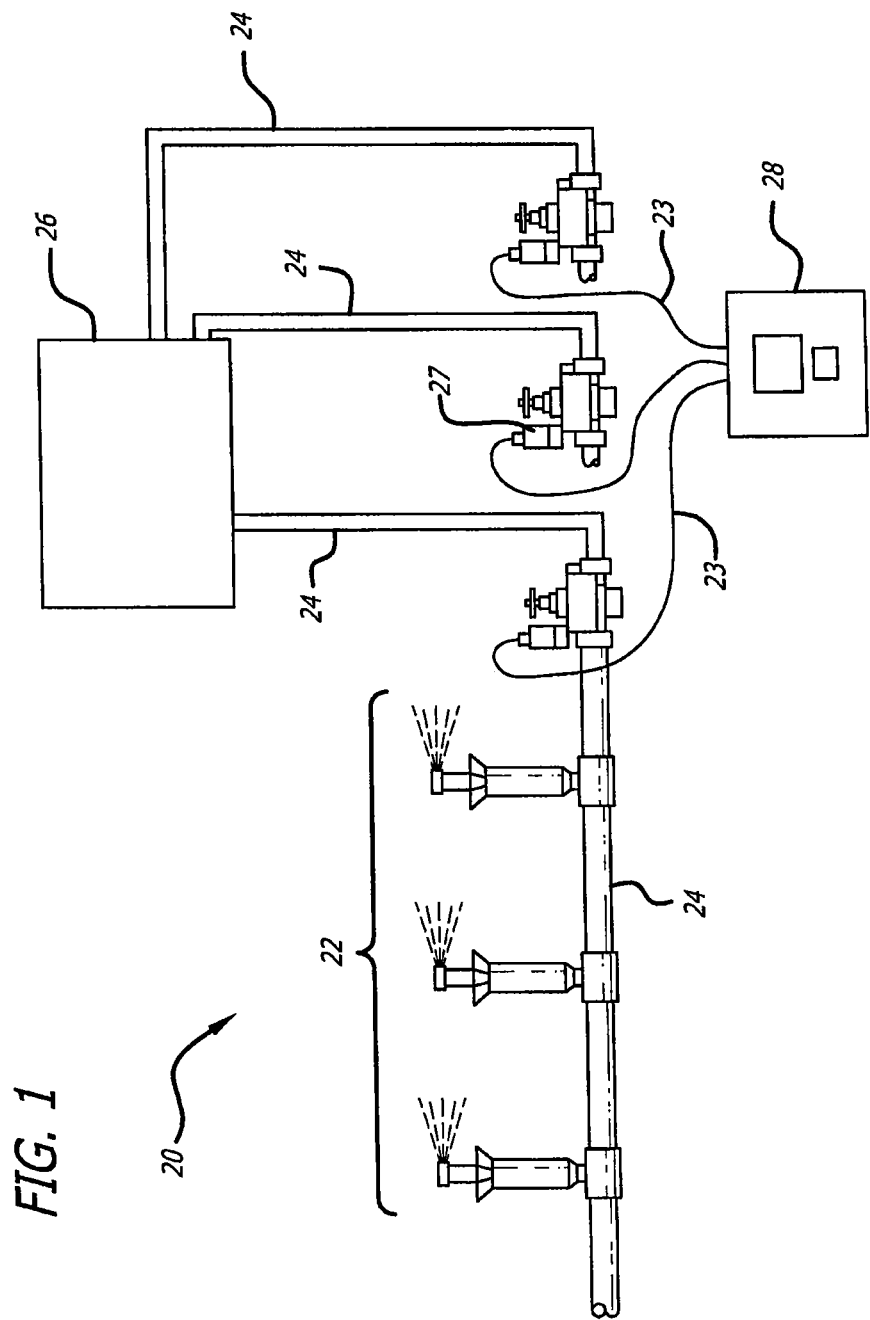
FIG. 1 is a schematic view of an irrigation system having features of the present invention

With respect to FIG. 1, a typical irrigation system 20 includes a plurality of sprinkler heads 22, all linked by conduits 24 to a source 26 of water pressure, the heads being configured to discharge water onto a surrounding landscape either in unison, or one after the other, or in a combination of both. This system may include a number of "zones," in which sprinkler heads are dedicated to act in unison in different parts of a landscape. The overall system may be controlled by a single electronic controller 28, which activates water to flow in different portions of the system 20 at different times, and for selected durations.

In this context, a preferred embodiment of the present invention is described with respect to FIGS. 1-4. A preferred embodiment provides an irrigation system 20 that automatically adjusts the amount of water to be discharged by the system onto a surrounding landscape, according to anticipated environmental conditions in the vicinity of the system.

Figure 2:
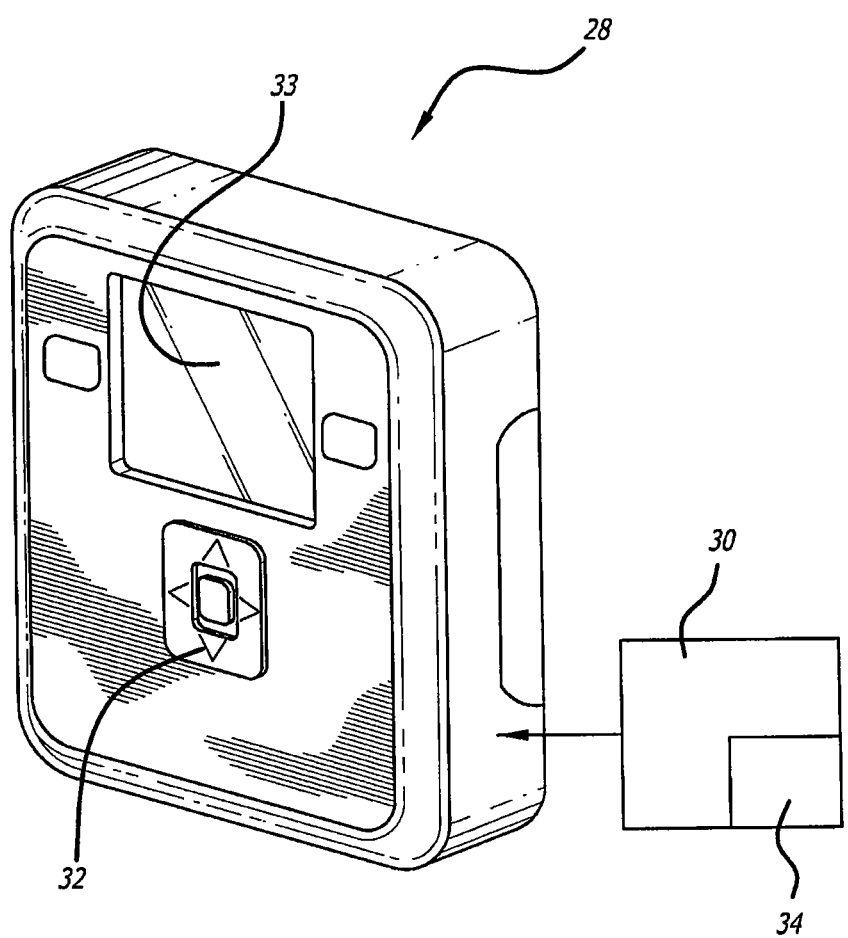
FIG. 2 is a schematic view of an irrigation controller as exemplified in FIG. 1

A sprinkler controller 28 is provided that harnesses a microprocessor 30. (FIG. 2, showing the microprocessor schematically within the controller.) The controller also includes input means 32 for entering parameters such as the present time and date, the times of day to commence irrigation in each zone, the duration for an irrigation event, and the like into the microprocessor. It also includes an LCD screen 33 to facilitate entry of parameters. The controller 28 is operatively connected with conduits 24 that lead water from a supply 26 to a plurality of sprinkler heads 22 forming part of the irrigation system 20. The microprocessor 30 is configured to interpret instruction data that has been input by a user, and consequently to initiate irrigation via the conduits 24 according to such data, most particularly to commence irrigation and then to terminate irrigation after an appropriate irrigation duration has been completed. Such irrigation initiation is achieved through switched valves 27 that are electrically operated and are interposed between the controller 28 and the water supply 26, and operatively connected to the controller 28 via electrical wires 23.

Figure 3:
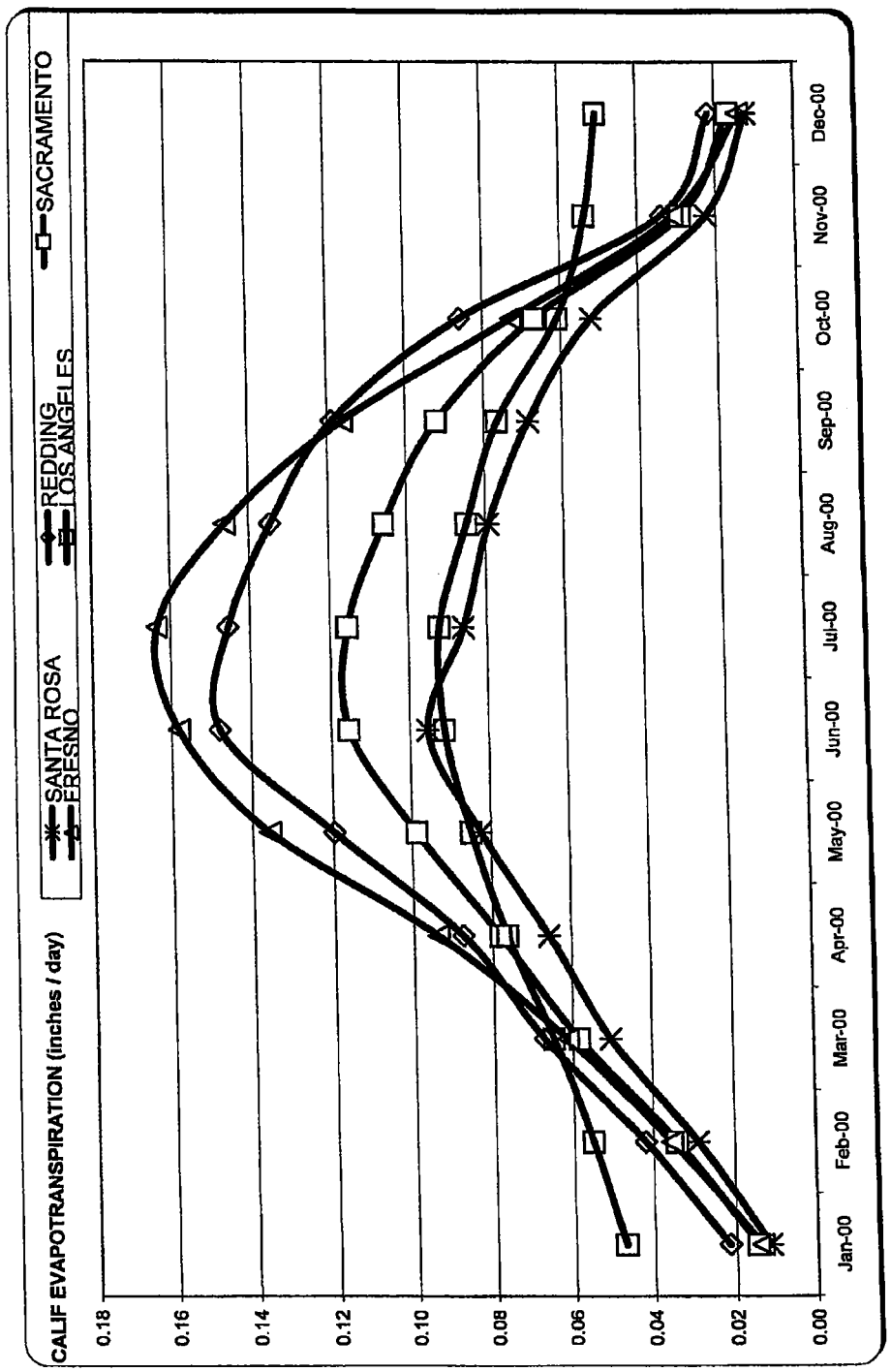
FIG. 3 is a graph of average evapo-transpiration rates in five different geographical sectors in California, over the period of one year.

Importantly in the present invention, the microprocessor 30 also includes a database 34 configured to enable the controller 28, independently of the user, to adjust the duration of irrigation for an irrigation event that has been instructed by the user. This adjustment is directed at reducing the amount of water discharged during irrigation for periods of the year when the evapo-transpiration ("ET") rate in the vicinity of the system 20 is lower than at its peak level. The peak level typically occurs some time in June through August of any year in the northern hemisphere. Evapo-transpiration is a term used to describe the sum of evaporation and plant transpiration from the earth's land surface to atmosphere. Evaporation accounts for the movement of water to the air from sources such as the soil, canopy interception, and waterbodies. Transpiration accounts for the movement of water within a plant and the subsequent loss of water as vapor through stomata in its leaves. Evapo-transpiration is an important part of the water cycle. Historical records of the ET rate for the United States have been kept and are available from a number of sources, including government managed weather stations such as CIMIS (California Irrigation Management Information System, maintained by the California Department of Water Resources), CoAgMet maintained by Colorado State University-Atmospheric Sciences, AZMET maintained by University of Arizona-Soils, Water and Environmental Science Department, New Mexico State University-Agronomy and Horticulture, and Texas A&M University-Agricultural Engineering Department. Although slight variations in the methods used to determine the ET values do exist, most ET calculations are based on the following environmental factors: temperature, solar radiation, wind speed and humidity. A typical plot of average evapo-transpiration rates against time for different cities in California in the United States over the period of a year is shown in FIG. 3.

In a preferred aspect of the invention, the database 34 is derived from historical records of the ET rate over a year throughout a geographical area, preferably throughout the United States, and also preferably throughout any part of the world in which historical ET rate records are known and where the irrigation system 20 may be used. The geographic area for which the database 34 is compiled is preferably broken down into a plurality of smaller sectors, each sector being identified for example by the name of a nearby town, or by county name, or even by state, where the ET rates are relatively uniform, but most preferably may be identified by a postal zip code as a small area within which the ET rates are likely to be uniform. Thus, in a preferred embodiment, the database 34 is compiled to reflect the average ET rate in each postal zip code area in the United States for a monthly, weekly, or shorter time period, over the duration of a year. While a month is a useful period of time in which to capture the changes in ET rate in a sector, a half-monthly period provides a smoother transition over the course of a year, and a weekly or daily period provides an even smoother transition. Daily average ET rates are also available in the historical record, and these rates may be used where it is desirable to follow a precise transition over the course of a year in short increments. For example, in FIG. 3, the ET rates for different parts of California are shown on curves that are smoothed and from which daily ET rates can be extracted. Similar records are available throughout the United States and other countries.

It will be understood that in a country such as the United States, many zip codes that are relatively closely situated will share the same ET data over the course of a year, but this fact need does not alter the ease with which each zip code may be assigned the appropriate ET data from historical sources. To this end, although the controller 28 may call for the entire zip code to be entered by a user, the database may be based on only the first three digits of a zip code, thus giving a less detailed breakdown of ET rates, although no less effective.

Once the above described data is assembled for a geographical area, it is processed by performing the following steps for each sector (e.g., zip code):

a) Identifying the maximum period-average ET rate that occurs in a year, "ETmax" (typically occurring some time June through August in the northern hemisphere);

b) Identifying the historical period-average ET rate for each period of the year, "ETperiod."

c) Dividing ETperiod by ETmax, to provide a Period Reduction Factor for each period of the year, the "PRF" for each period.

As used above, the term "period" may refer to the period of a month, although a half-monthly, weekly, or even daily period may apply where appropriate.

Thus, preferably before any instructions have been entered into the microprocessor 30 by the user, the manufacture has compiled and stored in the database 34 an array of information in which each sector (preferably, zip code) in a geographical area has, associated with it, a plurality of PRFs—one for each period of the year whether the period be a month, a half-month, a week, or a day. (See, FIG. 4.) It will be appreciated that alternative methodologies may be used to assemble the database 34. For example, the ET rates themselves may be entered into the database, in which an algorithm may be selected to extract the relevant PRF for application, but eventually an applicable PRF is derived from data within the microprocessor and all such methodologies are contemplated as falling within the scope of the invention.

When the user purchases and installs an irrigation control system 20 having features of the present invention, the controller 28 calls for certain information via the LCD screen 33, by prompting the user to enter the information sequentially via the input means 32. (FIG. 2.) In addition to the usual start times for each irrigation event in each of a plurality of zones, one parameter that the user will be requested to enter in conjunction with each start time is the Maximum Irrigation Duration ("Dmax") for each irrigation event that the user wishes to occur during the period that the ET rate will be greatest in the location where the control system is being installed. For example, although the user may be installing his unit in March, the controller will ask him to enter the maximum irrigation duration (Dmax) that he wishes to apply at the peak of summer when the ET rate is greatest. Another parameter that the user will be requested to enter is the current date, and another is the identity of the sector in which the system 20 is being set up to operate. For a system intended to operate in the United States, this latter parameter will preferably be the postal zip code in which the system is installed. Once the duration Dmax, the current date, and sector identification are entered, the microprocessor 30 performs the following adjustments to take into account the inevitable seasonal changes, and the changing ET rates, over the duration of a year. Based on the current date, the microprocessor selects the appropriate PRF for the applicable sector from the database 34. The microprocessor then computes an Actual Irrigation Duration ("Dactual") for the current period by multiplying the maximum duration, Dmax, entered by the user, by the PRF for that period obtained from the database 34. Thus, in the period of January, for example, when the ET rate for a particular sector may be only 16% of the maximum summer ET rate in that sector (so that the PRF for January is 16%), the Actual Irrigation Duration, Dactual, will be computed to be 16% of Dmax. (See FIG. 4). The microprocessor 30 then sets the applicable duration for current irrigation events to be the Actual Irrigation Duration, Dactual, and not the maximum irrigation duration, Dmax. For other or shorter periods, the same principle will apply. Then, when the time arrives for irrigation on any day, the microprocessor 30 causes the irrigation system to irrigate for a period of time Dactual rather than Dmax. This process is exemplified in FIG. 5.

Figure 4:
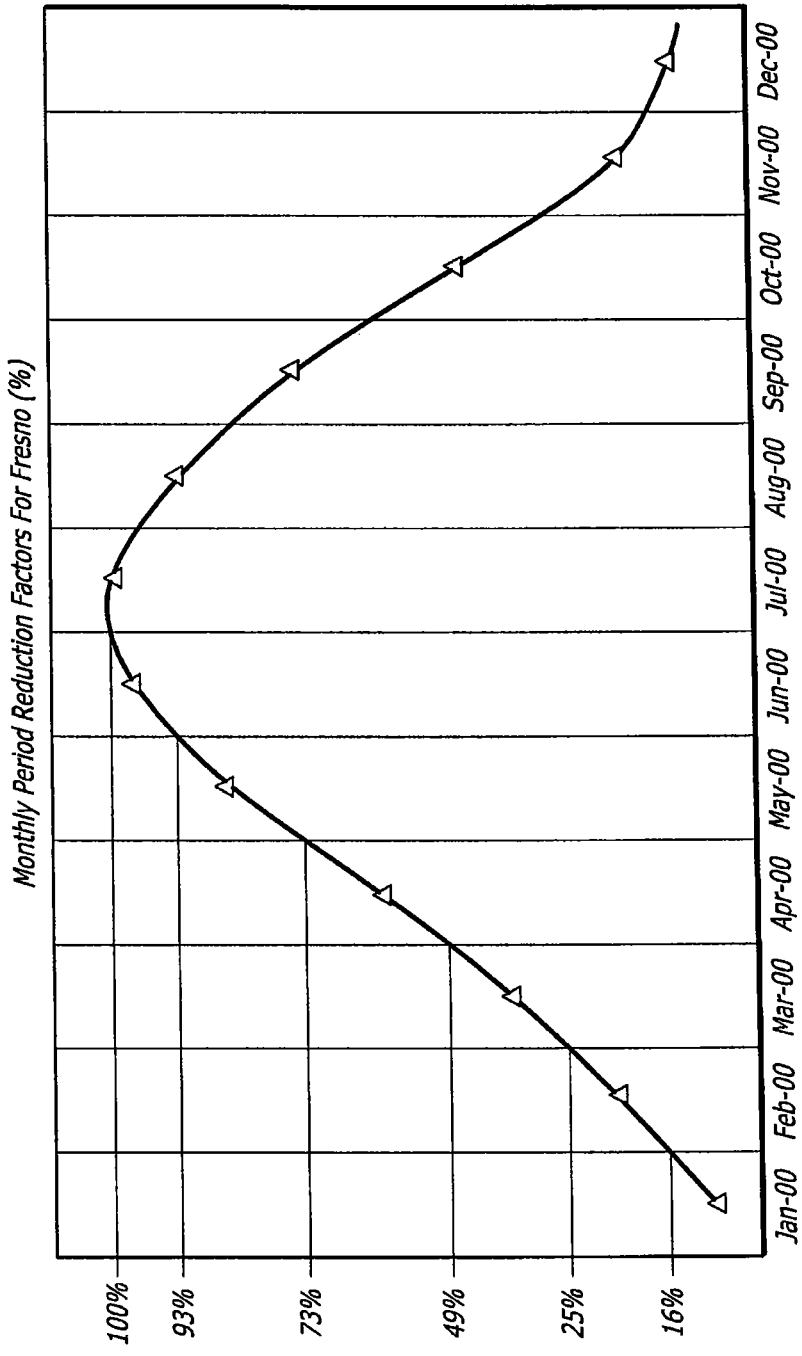
FIG. 4. is a graph of Monthly Period Reduction Factors for the sector Fresno, Calif.
Figure 5:
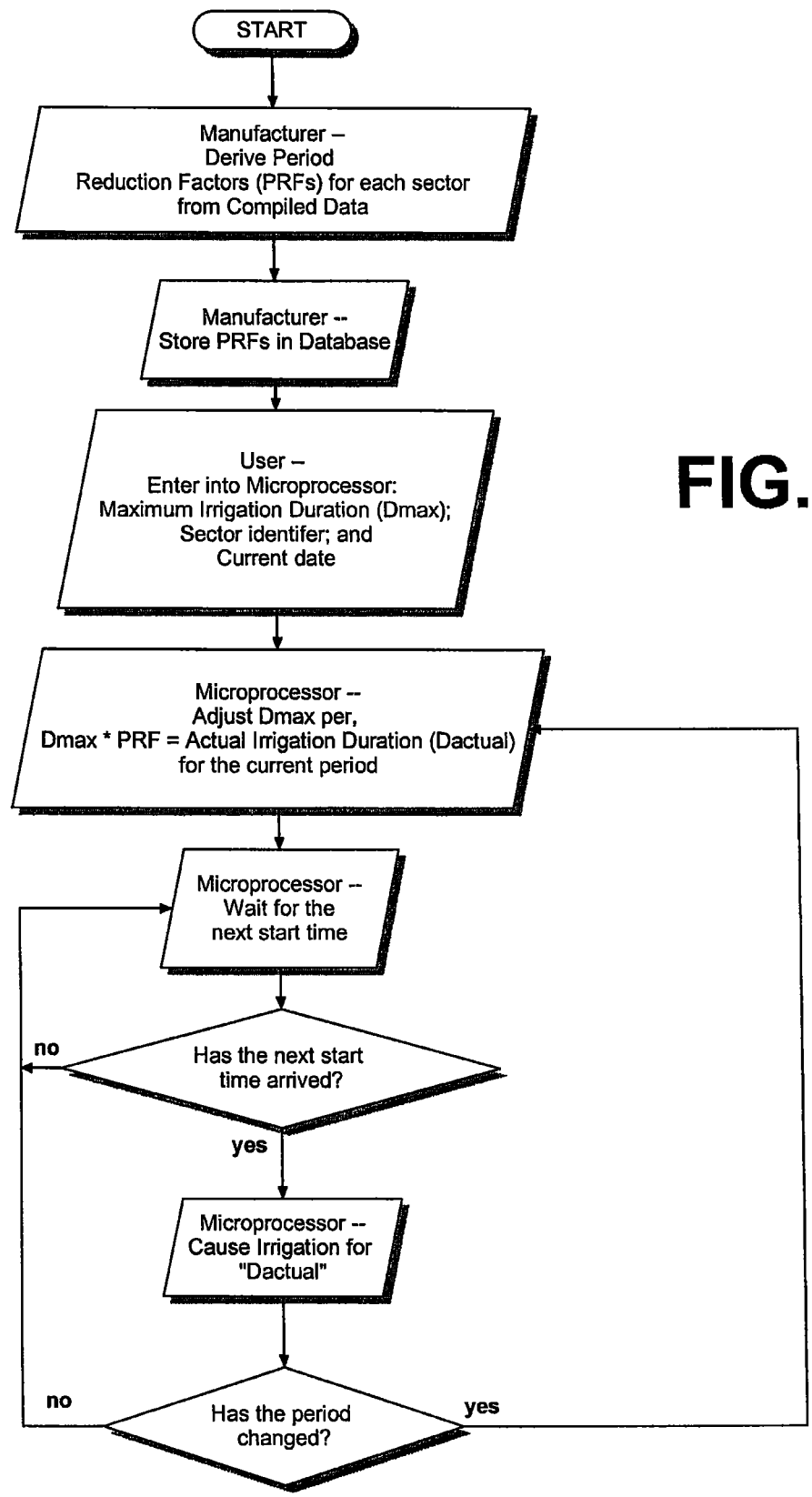
FIG. 5 is a flow diagram showing steps taken in an aspect of the invention.

Moreover, after the current "period" has passed (as noted, "period may be month, half month, week, day or other suitable time period), the microprocessor 30 is configured to sequentially recalculate the Actual Irrigation Duration in each new period by applying the Period Reduction Factor (PRF) associated with each new period, and causing the irrigation system to irrigate for the resulting Actual Irrigation Duration (Dactual) during the new current period. (See, FIG. 5.) For example, the curves of ET rate in FIGS. 3 and 4 show smoothed curves from which the Dactual may be derived on a daily basis.

It will be appreciated that, in use, after the above procedure of information entry and duration adjustment has been completed in a period that does not coincide with maximum ET rate, a user may monitor the actual irrigation duration, Dactual, caused by the controller according to the above described process. After observing the actual irrigation durations, it is possible that a user may conclude that insufficient water (or too much water) is being caused to discharge by the controller in each irrigation event. Under these circumstances, a user may manually alter the Dmax that he had previously input, so that the current Dactual increases or reduces proportionally. When the user is satisfied that the Dactual for the current period is acceptable, he can reasonably assume that the Dactual that will be caused in the period of greatest ET rate (that will in effect be 100% of Dmax) will be appropriate for that period also. Thus, by a series of small initial adjustments, even during a period when maximum ET rate does not exist, a user may achieve an optimal rate of irrigation that applies over the period of a whole year.

In the manner described, once the data entries have been made and adjustments are concluded, it will be appreciated that the microprocessor continually adjusts the irrigation duration for any individual sprinkler system to take into account the historic variation in period average ET rates over the period of a year, each adjustment being made incrementally after a period of time which may be a month, a half month, a week, or a day, depending on the requirements of the irrigation project. Preferably, use of the smooth ET rate and PRF curves exemplified in FIGS. 3 and 4 would permit adjustment to be made on a daily period basis.

The invention thus has the advantage of efficiently and rationally applying a modification in water irrigated onto a landscape to accommodate the seasonal changes in ET rate of a particular sector. The invention has versatility in that it may be sold, with a preprogrammed database 34 that includes either a table of Period Reduction Factors (PRFs), or the information necessary (e.g. ET rates) to extract, via an algorithm, PRFs in any sector based, preferably, on the postal zip code where the system 20 will be used. Thus, a purchaser may install such a system in Mississippi or in California and enter the information required to initialize the system, including the zip code where the system is to be used, and the date. In each case the information in the database allows the microprocessor 30, by using the database 34, to periodically select the duration of actual irrigation (Dactual) for any particular sector in a way that is rationally and efficiently based on the changing seasonal ET rate in the selected sector, and accounts for likely rainfall, and for dry, hot, and windy conditions. This aspect of the invention has the considerable advantage of relieving the user of responsibility for manually adjusting the duration for irrigation every period, which a user typically may forget to do after a few adjustments. It also has the advantage of achieving a result that is very similar to a result in which a sprinkler system uses a sensor device to measure the actual environmental conditions for adjustment based on actual environmental conditions, while avoiding all the disadvantages including the cost of such systems.

Thus, it will be apparent from the foregoing that, while particular forms of the invention have been illustrated and described, various modifications can be made without parting from the spirit and scope of the invention.

I claim:

1. A controller for controlling an irrigation schedule in an irrigation system, the irrigation system including a plurality of sprinkler heads connected via a plurality of conduits to a water source, the controller comprising:
   a database that includes information relating to historical evapo-transpiration rates for a plurality of sectors located within a geographical area, the information including the historical period-average evapotranspiration rate for each period of the year per sector, and the maximum period-average evapotranspiration rate that occurs in one year per sector;
   an input means for permitting a user to enter irrigation parameters into the controller, wherein the parameters include:
   a Maximum Irrigation Duration;
   an identifier for identifying the sector in which the irrigation system is located; and
   the current date; and
   a microprocessor configured to divide, for each sector, the historical period-average evapotranspiration rate for each period of the year by the maximum period-average evapotranspiration rate to provide a Period Reduction Factor for each sector, and being further configured to adjust the Maximum Irrigation Duration that has been entered into the controller by multiplying the Maximum Irrigation Duration by the Period Reduction Factor for the current period associated with the sector that has been identified by the user, to obtain an Actual Irrigation Duration for the current period for the identified sector, the microprocessor being further configured to cause the irrigation system to irrigate for the Actual Irrigation Duration during the current period.

2. The controller of claim 1, wherein the sector identifier is a zip code.

3. The controller of claim 1, wherein the sector identifier is a county name.

4. The controller of claim 1, wherein the sector identifier is a city name.

5. The controller of claim 1, wherein the microprocessor is configured to sequentially recalculate the Actual Irrigation Duration in each new period by applying the Period Reduction Factor associated with each new period, and causing the irrigation system to irrigate for the Actual Irrigation Duration during the new current period.

6. The controller of claim 1, wherein the period associated with the Period Reduction Factor is a month.

7. The controller of claim 1, wherein the period associated with the Period Reduction Factor is a week.

8. The controller of claim 1, wherein the period associated with the Period Reduction Factor is a day.

9. A method of controlling the duration of irrigation by an irrigation system that includes a plurality of sprinkler heads connected via a plurality of conduits to a water source, the method comprising:
   compiling a database that includes information relating to historical evapo-transpiration rates for a plurality of sectors located within a geographical area;
   entering irrigation parameters into the controller, wherein the parameters include:
   a Maximum Irrigation Duration;
   an identifier for identifying the sector in which the irrigation system is situated; and
   the current date;
   deriving, from the information, Period Reduction Factors applicable over a year for a sector identified by a user, wherein the Period Reduction Factors are derived as the historical period-average evapotranspiration rate for each period of the year, divided by the maximum period-average evapotranspiration rate that occurs in a year for the identified sector;
   adjusting the Maximum Irrigation Duration by multiplying the Maximum Irrigation Duration by a Period Reduction Factor for the current period, to obtain an Actual Irrigation Duration for the current period for the identified sector; and
   causing the irrigation system to irrigate for the Actual Irrigation Duration during the current period.

10. The method of claim 9, wherein entering a sector identifier into the controller includes entering a zip code.

11. The method of claim 9, wherein entering a sector identifier into the controller includes entering a county name.

12. The method of claim 9, wherein entering a sector identifier into the controller includes entering a city name.

13. The method of claim 9, wherein the period associated with the Period Reduction Factor is one month.

14. The method of claim 9, wherein the period associated with the Period Reduction Factor is one week.

15. The method of claim 9, wherein the period associated with the Period Reduction Factor is one day.

16. The method of claim 9, wherein adjusting the Maximum Irrigation Duration includes sequentially recalculating the Actual Irrigation Duration in each new period by applying the Period Reduction Factor associated with each new period, and causing the irrigation system to irrigate for the Actual Irrigation Duration during the new current period.

* * * * *